(12) United States Patent
Kim

(10) Patent No.: US 8,492,014 B2
(45) Date of Patent: Jul. 23, 2013

(54) SECONDARY BATTERY

(75) Inventor: Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 159 days.

(21) Appl. No.: 13/064,797

(22) Filed: Apr. 15, 2011

(65) Prior Publication Data

US 2012/0148883 A1    Jun. 14, 2012

(30) Foreign Application Priority Data

Dec. 8, 2010  (KR) .................. 10-2010-0125166

(51) Int. Cl.
*H01M 10/42*        (2006.01)

(52) U.S. Cl.
USPC ............................................ 429/61; 429/179

(58) Field of Classification Search
USPC ...................... 429/181, 53, 61, 179
See application file for complete search history.

(56) References Cited

U.S. PATENT DOCUMENTS

| 2008/0254343 A1* | 10/2008 | Kaplin et al. ................. 429/53 |
| 2011/0183193 A1 | 7/2011 | Byun et al. |
| 2012/0244424 A1* | 9/2012 | Cho et al. ..................... 429/181 |

FOREIGN PATENT DOCUMENTS

| JP | 10-125305 | 5/1998 |
| KR | 10-2002-0021888 A | 3/2002 |
| KR | 10-2004-0080731 A | 9/2004 |
| KR | 10-1042808 B1 | 6/2011 |

\* cited by examiner

*Primary Examiner* — Mark F Huff
*Assistant Examiner* — Monique Wills
(74) *Attorney, Agent, or Firm* — Lee & Morse, P.C.

(57) ABSTRACT

A secondary battery includes an electrode assembly, a case accommodating the electrode assembly and including an opening, an electrode terminal connected to the electrode assembly and protruding outwardly from the case; a cap assembly including a cap plate in sealing engagement with the opening of the case, and a switch plate connected to the electrode terminal.

14 Claims, 5 Drawing Sheets

SECONDARY BATTERY

BACKGROUND

1. Field

Embodiments relate to a secondary battery.

2. Description of the Related Art

Secondary batteries are rechargeable, unlike primary batteries. Among such secondary batteries, a low capacity battery including a battery cell in the form of a pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery is constructed as follows: an electrode assembly formed by disposing an insulating separator between a positive electrode plate and a negative electrode plate is placed in a case together with electrolyte, and a cap plate is disposed on the case. The electrode assembly is connected to electrode terminals which protrude from the cap plate and are exposed to the exterior of the secondary battery.

SUMMARY

According to an embodiment, there is provided a secondary battery including an electrode assembly, a case accommodating the electrode assembly and including an opening, an electrode terminal connected to the electrode assembly and protruding outwardly from the case, a cap assembly including a cap plate in sealing engagement with the opening of the case, and a switch plate connected to the electrode terminal.

One part of the switch plate may be connected to the electrode terminal and another part of the switch plate may face a bottom surface of the cap plate.

The electrode terminal may include a first protrusion inserted in a collecting plate connected to the electrode assembly and a second protrusion inserted in the switch plate.

The switch plate may include a temperature sensing part through which the second protrusion is inserted, the temperature sensing part being disposed between the electrode terminal and the collecting plate, and a switch part extending from a side of the temperature sensing part and having a bent shape.

The switch plate may further include a terminal hole through which the second protrusion of the electrode terminal is inserted.

The switch part may be formed of a shape-memory alloy.

The switch part may be bent upward and downward in an S-shape.

The switch plate may be brought into contact with a bottom surface of the cap plate when the secondary battery is in a temperature range from 80° C. to 150° C.

The switch plate may be brought into contact with a bottom surface of the cap plate if the secondary battery is heated to 80° C. or higher.

The switch plate may include a shape-memory alloy that changes shape when a temperature of the shape-memory alloy rises from a temperature that is less than a predetermined temperature to a temperature that is equal to or greater than the predetermined temperature, and the switch plate may be configured and disposed to face, but not contact, a bottom surface of the cap plate when the temperature of the switch plate has not risen above the predetermined temperature and to contact the bottom surface of the cap plate when the temperature of the switch plate has risen to the predetermined temperature.

The predetermined temperature may be 80° C. or higher.

The predetermined temperature may be in a range of from about 80° C. to about 150° C.

The cap assembly may further include an insulating member disposed at a bottom surface of the cap plate.

The insulating member may include a switch hole that allows the switch plate to make contact with the bottom surface of the cap plate.

The insulating member may define a space that accommodates a portion of the electrode terminal and the switch plate inside the case.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
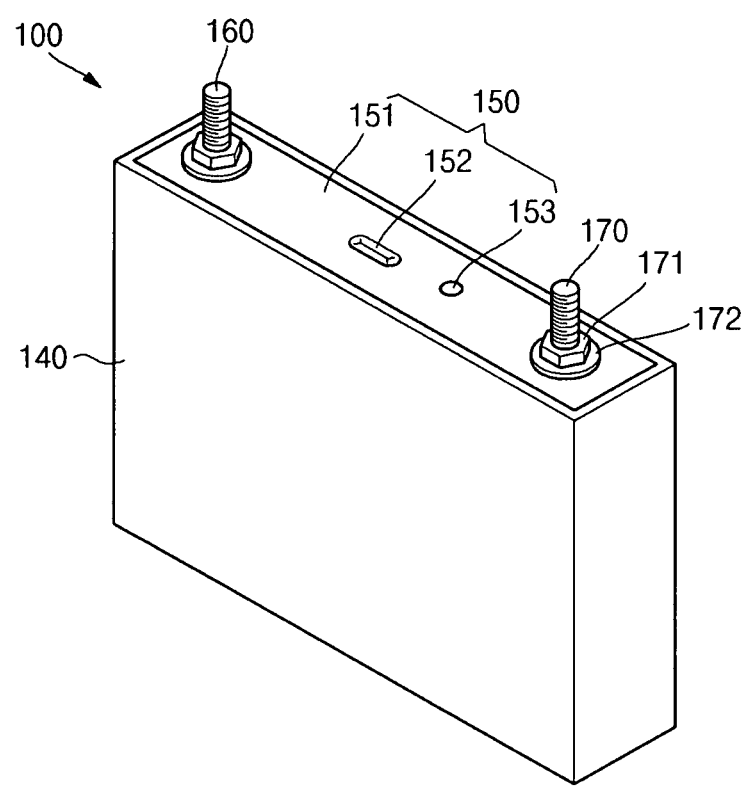
FIG. 1 illustrates a perspective view relating to a secondary battery according to an embodiment.

Korean Patent Application No. 10-2010-0125166 filed on Dec. 8, 2010, in the Korean Intellectual Property Office, and entitled: "Secondary Battery" is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Like reference numerals refer to like elements throughout.

In addition, it will be understood that when a part is referred to as being electrically connected to another part, it can be directly connected to the other part, or intervening parts may also be present.

Figure 2:
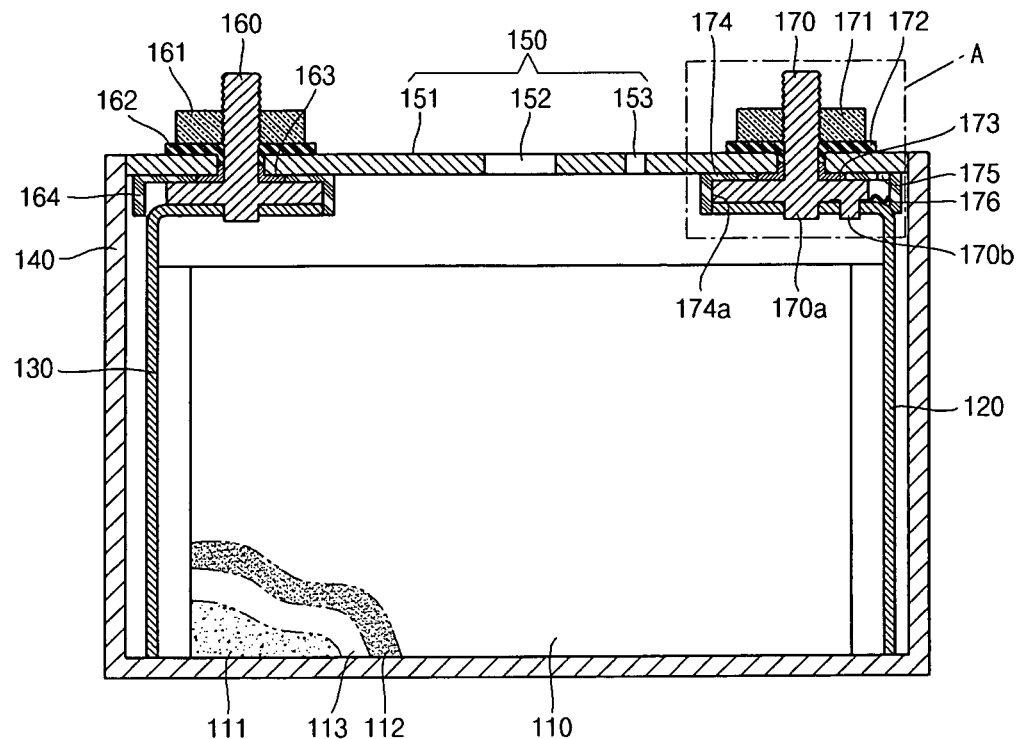
FIG. 2 illustrates a sectional view of FIG. 1.
Figure 3:
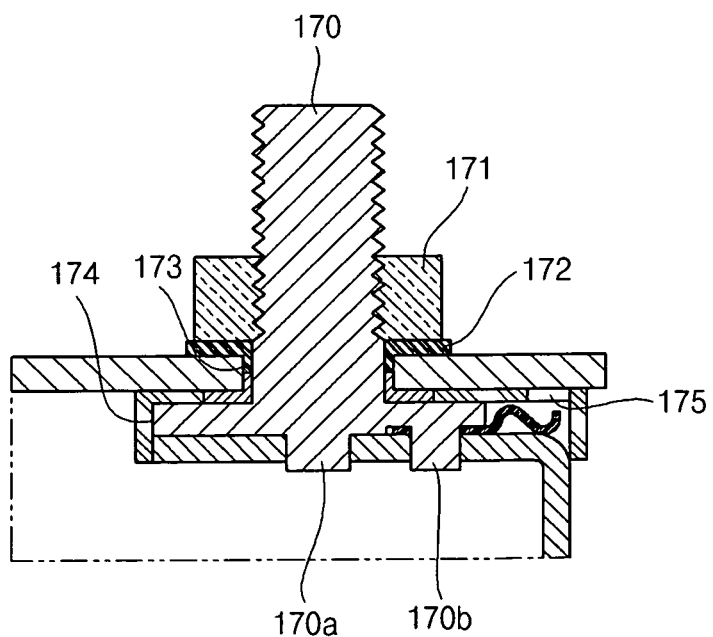
FIG. 3 illustrates an enlarged sectional view relating to portion A of FIG. 2.
Figure 4:
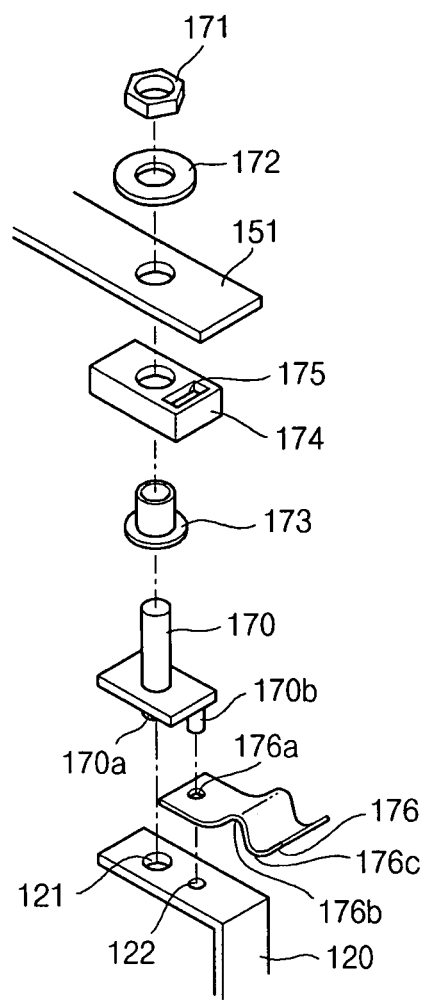
FIG. 4 illustrates an exploded perspective view of FIG. 3.
Figure 5:
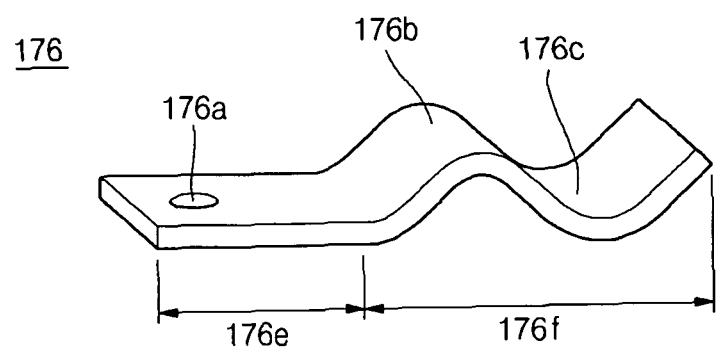
FIG. 5 illustrates a perspective view relating to a switch plate depicted in FIG. 4.
Figure 6:
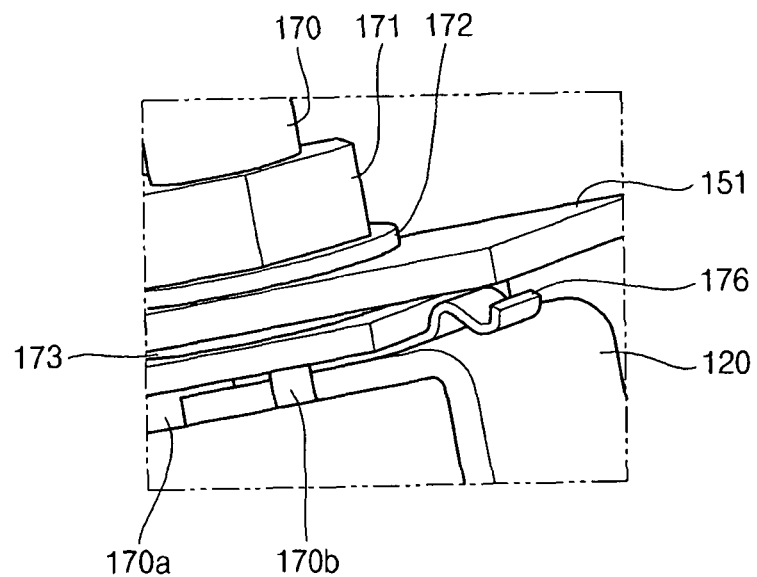
FIG. 6 illustrates a perspective view relating to the switch plate depicted in FIG. 3, without an insulating member being present.
Figure 7:
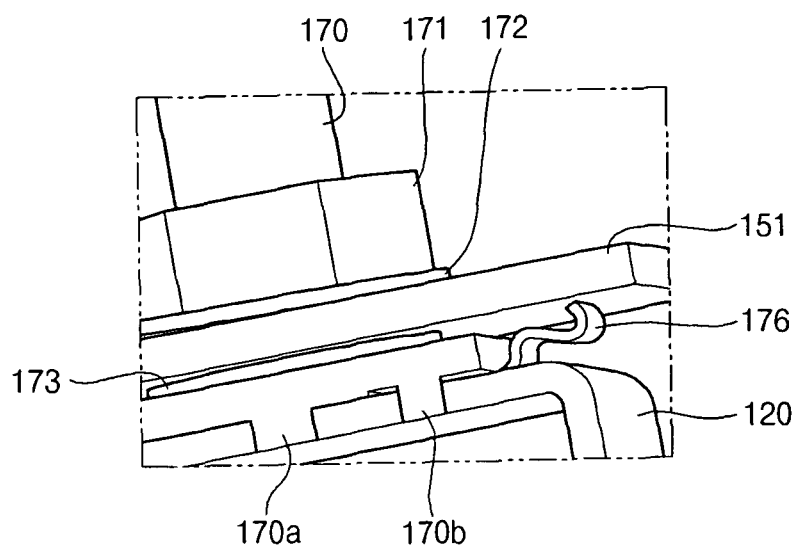
FIG. 7 illustrates a perspective view illustrating a state where the switch plate shown in FIG. 5 makes contact with the bottom side of a cap plate.

FIG. 1 illustrates a perspective view relating to a secondary battery according to an embodiment. FIG. 2 illustrates a sectional view of FIG. 1. FIG. 3 illustrates an enlarged sectional view relating to portion A of FIG. 2. FIG. 4 illustrates an exploded perspective view of FIG. 3. FIG. 5 illustrates a perspective view relating to a switch plate depicted in FIG. 4. FIG. 6 illustrates a perspective view relating to the switch plate depicted in FIG. 3, without an insulating member being present. FIG. 7 illustrates a perspective view relating to a state where the switch plate shown in FIG. 5 makes contact with the bottom side of a cap plate.

Referring to FIGS. 1 through 4, a secondary battery 100 of the current embodiment includes an electrode assembly 110, first and second collecting plates 120 and 130, a case 140, a cap assembly 150, and a switch plate 176.

The electrode assembly 110 may be formed by winding or stacking a first electrode plate 111, a separator 113, and a second electrode plate 112, which may have a thin plate or film shape. The first electrode plate 111 may function as a negative electrode, and the second electrode plate 112 may function as a positive electrode. Alternatively, the first electrode plate 111 and the second electrode plate 112 may function oppositely.

The electrode assembly 110 may be accommodated in the case 140 together with an electrolyte. The electrolyte may include an organic solvent such as ethylene carbonate (EC), propylene carbonate (PC), diethyl carbonate (DEC), ethyl methyl carbonate (EMC), and dimethyl carbonate (DMC); and a lithium salt such as $LiPF_6$ or $LiBF_4$. The electrolyte may be a liquid, solid, or gel.

The first electrode plate 111 may be formed by applying a first electrode active material, such as graphite or carbon, to a first electrode collector formed of metal foil such as copper or nickel foil. The first electrode plate 111 may include a first electrode non-coating portion to which the first electrode active metal is not applied. The first electrode non-coating portion may function as a current flow passage between the first electrode plate 111 and the outside of the first electrode plate 111. Materials that can be used to form the first electrode plate 111 are not limited to the above-mentioned materials.

The second electrode plate 112 may be formed by applying a second electrode active material, such as a transition metal oxide, to a second electrode collector formed of metal foil, such as aluminum foil. The second electrode plate 112 may include a second electrode non-coating portion to which the second electrode active metal is not applied. The second electrode non-coating portion may function as a passage for current between the second electrode plate 112 and the outside of the second electrode plate 112. Materials that can be used to form the second electrode plate 112 are not limited to the above-mentioned materials.

The polarities of the first and second electrode plates 111 and 112 may be changed with each other.

The separator 113 is disposed between the first electrode plate 111 and the second electrode plate 112. The separator 113 prevents a short circuit and allows movement of lithium ions. The separator 113 may be formed of a polyethylene film or a film including polyethylene and polypropylene. Materials that can be used to form the separator 113 are not limited to the above-mentioned materials.

The electrode assembly 110 may be formed by winding the first electrode plate 111, the separator 113, and the second electrode plate 112 in a manner such that the first electrode non-coating portion protrudes from an upper end of the electrode assembly 110 and the second electrode non-coating portion protrudes from a lower end of the electrode assembly 110. The first electrode plate 111, the separator 113, and the second electrode plate 112 of the electrode assembly 110 may be wound in a vortex shape.

The first and second collecting plates 120 and 130 may be coupled to respective end parts of the electrode assembly 110 in a manner such that the first and second collecting plates 120 and 130 are electrically connected to the first and second electrode plates 111 and 112, respectively.

The first collecting plate 120 may include a first terminal coupling part 121, a second terminal coupling part 122, and a base. The first collecting plate 120 may be formed of a metal or an equivalent thereof. For example, the first collecting plate 120 may be formed of copper or a copper alloy. However, the material of the first collecting plate 120 is not limited thereto. The first collecting plate 120 may have an approximately reverse L-shape. For example, the first terminal coupling part 121 and the second terminal coupling part may extend parallel to the cap plate and the base part may extend perpendicular to the first terminal coupling part 121 and the second terminal coupling part in a direction toward the bottom of the case. The first and second terminal coupling parts 121 and 122 may be electrically connected to a terminal by inserting lower protrusions of the terminal into the first and second terminal coupling parts 121 and 122. The base may be connected to the first electrode non-coating portion of the electrode assembly 110.

The second collecting plate 130 may have the same structure as that of the first collecting plate 120. Thus, a detailed description of the second collecting plate 130 will be omitted.

The case 140 may be formed of a conductive metal such as aluminum, aluminum alloy, or steel plated with nickel. The case 140 may have an approximately hexahedral shape with an opening so that the electrode assembly 110, a first electrode terminal 170, and a second electrode terminal 160 can be inserted and placed in the case 140. The secondary battery 100 may be sealed by coupling the cap assembly 150 to the opening of the case 140. The inner surface of the case 140 may be treated to be electrically insulated from the electrode assembly 110, the first electrode terminal 170, the second electrode terminal 160, and the cap assembly 150.

The cap assembly 150 may include a cap plate 151, a safety vent 152, and a plug 153. The cap plate 151 seals the case 140. The cap plate 151 may include a bottom surface facing the interior of the case 140. The cap plate 151 may include a hole so that the first electrode terminal 170 connected to the first collecting plate 120 can be inserted through the cap plate 151. In addition, the cap plate 151 may include a hole so that the second electrode terminal 160 connected to the second collecting plate 130 can be inserted through the cap plate 151. The electrode terminals 160 and 170 may include upper gaskets 162 and 172, and lower gaskets 163 and 173 so that the cap plate 151 can be insulated from the electrode terminals 160 and 170. In addition, the electrode terminals 160 and 170 may include nuts 161 and 171 so that the electrode terminals 160 and 170 can be fixed to the cap plate 151 by tightening the nuts 161 and 171 on the electrode terminals 160 and 170. After electrode is injected through an electrolyte injection hole (not shown) of the cap plate 151, the electrode injection hole may be closed with the plug 153 of the cap assembly 150. The cap plate 151 may include the safety vent 152. The safety vent 152 may have a thin thickness, and thus if pressure increases to a set value, the safety vent 152 may be broken to release gas.

First and second insulating members 174 and 164 may be disposed on the bottom side of the cap plate 151. Electrode terminal accommodation spaces (refer to 174a in FIG. 2) may be defined inside the first and second insulating members 174 and 164.

The first and second insulating members 174 and 164 may prevent a short circuit between the cap plate 151 and the electrode terminals 170 and 160. The first insulating member 174 may prevent a short circuit between the first collecting plate 120 and the cap plate 151. The second insulating member 164 may prevent a short circuit between the second collecting plate 130 and the cap plate 151. The first and second insulating members 174 and 164 may be formed of polyphenylene sulfide (PPS). However, the current embodiment is not limited thereto.

The first insulating member 174 may include a switch hole 175. The switch plate 176 may make contact with the bottom surface of the cap plate 151 through the switch hole 175.

The switch plate 176 may include a terminal hole 176a, a temperature sensing part 176e, and a switch part 176f.

The switch plate 176 is formed of a conductive material. The switch plate 176 is connected to the first electrode terminal 170 and has the same polarity as that of the first electrode terminal 170. If the inside cell temperature increases to a predetermined temperature, such as, for example, 80° C. or higher, an end of the switch plate 176 comes into contact with the bottom surface of the cap plate 151. The cap plate 151 and the switch plate 176 have different electrical polarities. The switch plate 176 makes contact with a portion of the bottom surface of the cap plate 151 to cause an electric short circuit.

A protrusion 170b formed on the bottom surface of the first electrode terminal 170 may be inserted through the terminal hole 176a of the switch plate 176. The protrusion 170b may also be inserted in the second terminal coupling part 122 of the first collecting plate 120. The first electrode terminal 170, the switch plate 176, and the first collecting plate 120 are electrically connected to each other.

The temperature sensing part 176e may be disposed between the first electrode terminal 170 and the first collecting plate 120. The temperature sensing part 176e may have a large contact area with the first electrode terminal 170 and the first collecting plate 120 so that the temperature sensing part 176e can be sensitive to the inside cell temperature. If the inside cell temperature is a predetermined temperature, such as, for example, 80° C. or higher, an end of the switch part 176f is brought into contact with the bottom surface of the cap plate 151. For example, when the inside cell temperature is in the range from 80° C. to 150° C., the end of the switch part 176f may be brought into contact with the bottom surface of the cap plate 151.

The switch part 176f may have a bent shape. The switch part 176f may be formed of a shape-memory alloy. Shape-memory alloys are easily deformed at a low temperature, and if heated to a certain temperature or higher, the shape-memory alloys return to their original shape. That is, the switch part 176f may have the above-described characteristics of shape-memory alloys. The switch part 176f may be curved in an S-shape, such as an S-shape in a horizontal orientation. By forming the switch part 176f in an S-shape, desired effects may be obtained with minimal deformation of the shape-memory alloy. The switch part 176f may include a first bent part 176b and a second bent part 176c. The first bent part 176b may be a gradually bent part extending from the temperature sensing part 176e and having a predetermined radius of curvature. The first bent part 176b may be bent in a manner such that the first bent part 176b protrudes toward the cap plate 151. The second bent part 176c may be bent from the first bent part 176b and may have a concave shape. The front end of the concave second bent part 176c is spaced apart from the cap plate 151 as long as the inside cell temperature has not reached the predetermined temperature. If the cell temperature increases to the predetermined temperature, such as, for example, 80° C. or higher, the end of the second bent part 176c is brought into contact with the bottom surface of the cap plate 151.

As described above, according to the embodiments, overcharging of the secondary battery may be prevented. Overcharging of the secondary battery may be prevented due to action of the switch plate in response to an increase in temperature that may occur in connection with an overcharging.

The switch plate and the cap plate have different polarities. If the inside cell temperature increases, the switch plate formed of a shape-memory alloy is brought into contact with the bottom surface of the cap plate. Due to the contacting of the switch plate and the cap plate in response to the temperature increase, overcharging of the secondary battery can be prevented, and thus the electric stability of the secondary battery can be improved.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is: ,

1. A secondary battery comprising:
   an electrode assembly;
   a case accommodating the electrode assembly and including an opening;
   an electrode terminal connected to the electrode assembly and protruding outwardly from the case;
   a cap assembly including a cap plate in sealing engagement with the opening of the case; and
   a switch plate connected to the electrode terminal,
   wherein the electrode terminal includes:
      a first protrusion inserted in a collecting plate connected to the electrode assembly; and
      a second protrusion inserted in the switch plate.

2. The secondary battery as claimed in claim 1, wherein one part of the switch plate is connected to the electrode terminal and another part of the switch plate faces a bottom surface of the cap plate.

3. The secondary battery as claimed in claim 1, wherein the switch plate includes:
   a temperature sensing part through which the second protrusion is inserted, the temperature sensing part being disposed between the electrode terminal and the collecting plate; and
   a switch part extending from a side of the temperature sensing part and having a bent shape.

4. The secondary battery as claimed in claim 3, wherein the switch plate further includes a terminal hole through which the second protrusion of the electrode terminal is inserted.

5. The secondary battery as claimed in claim 3, wherein the switch part is formed of a shape-memory alloy.

6. The secondary battery as claimed in claim 5, wherein the switch part is bent upward and downward in an S-shape.

7. The secondary battery as claimed in claim 1, wherein the switch plate is brought into contact with a bottom surface of the cap plate when the secondary battery is in a temperature range from 80° C. to 150° C.

8. The secondary battery as claimed in claim 1, wherein the switch plate is brought into contact with a bottom surface of the cap plate if the secondary battery is heated to 80° C. or higher.

9. The secondary battery as claimed in claim 1, wherein the switch plate includes a shape-memory alloy that changes shape when a temperature of the shape-memory alloy rises from a temperature that is less than a predetermined temperature to a temperature that is equal to or greater than the predetermined temperature, the switch plate being configured and disposed to face, but not contact, a bottom surface of the cap plate when the temperature of the switch plate has not risen above the predetermined temperature and to contact the bottom surface of the cap plate when the temperature of the switch plate has risen to the predetermined temperature.

10. The secondary battery as claimed in claim 9, wherein the predetermined temperature is 80° C. or higher.

11. The secondary battery as claimed in claim 9, wherein the predetermined temperature is in a range of from about 80° C. to about 150° C.

12. The secondary battery as claimed in claim 1, wherein the cap assembly further includes an insulating member disposed at a bottom surface of the cap plate.

13. The secondary battery as claimed in claim 12, wherein the insulating member includes a switch hole that allows the switch plate to make contact with the bottom surface of the cap plate.

14. The secondary battery as claimed in claim 12, wherein the insulating member defines a space that accommodates a portion of the electrode terminal and the switch plate inside the case.

\* \* \* \* \*